United States Patent [19]

Datta et al.

[11] Patent Number: 4,871,523

[45] Date of Patent: Oct. 3, 1989

[54] VANADIUM TETRACHLORIDE STABILIZATION

[75] Inventors: Sudhin Datta, Scotch Plains, N.J.; Trazollah Ouhadi, Liege, Belgium

[73] Assignee: Exxon Chemical Patents Inc., Linden, N.J.

[21] Appl. No.: 50,946

[22] Filed: May 15, 1987

[51] Int. Cl.$^4$ .................. C01G 31/04; C08F 2/00; C08F 4/44

[52] U.S. Cl. .................................... 423/265; 502/224; 526/69; 526/86; 526/141; 526/143; 526/903

[58] Field of Search ................ 423/265, 492; 502/224, 502/500; 260/695; 526/69, 86, 141, 143, 903

[56] References Cited

U.S. PATENT DOCUMENTS

| | | | |
|---|---|---|---|
| 3,622,548 | 11/1971 | Emde et al. | 526/86 |
| 4,435,552 | 3/1984 | Evens | 526/141 |

FOREIGN PATENT DOCUMENTS

| | | | |
|---|---|---|---|
| 0059034 | 1/1982 | European Pat. Off. | |
| 838227 | 6/1960 | United Kingdom | 526/143 |
| 1403372 | 8/1975 | United Kingdom. | |
| 1444169 | 7/1976 | United Kingdom. | |

*Primary Examiner*—John Doll
*Assistant Examiner*—Jeffrey Edwin Russel
*Attorney, Agent, or Firm*—J. B. Murray, Jr.; W. G. Muller

[57] ABSTRACT

Solutions of $VCl_4$ in inert organic solvent are stabilized by incorporation of decomposition retardants being halogenated organic compounds having at least two halogen atoms attached to the same carbon atom and activated by adjacent electron donor groups or carbon-carbon double bonds. One of the especially preferred stabilizers is butyl perchlorocrotonate. The solutions are useful in polymerization processes.

26 Claims, No Drawings

VANADIUM TETRACHLORIDE STABILIZATION

BACKGROUND OF THE INVENTION

1. Field of the Invention

This invention relates to a method of stabilizing solutions of vanadium tetrachloride in inert organic solvents and to stabilize solutions produced by the method. More particularly, but not exclusively, the invention relates to processes for copolymerizing olefins in which catalyst is introduced into the polymerization zone in stabilized form.

2. Description of the Prior Art

Many types of catalyst have been proposed for producing amorphous co-polymers of olefins, the so called Ziegler catalysts being particularly effective. It is generally known that good results can be achieved using a Ziegler-type catalyst comprising an organoaluminum compound and a vanadium compound soluble in an inert organic solvent. However, most of the vanadium-containing catalyst systems of this type, although exhibiting a very high activity in the initial stages of the polymerization, show a rapid drop in activity after a relatively short period of time and also have a low catalyst efficiency.

Examples of vanadium compounds which have been used in polymerization processes are vanadium halides and vanadium oxyhalides, such as vanadium tetrachloride, vanadium oxytrichloride, vanadium oxytribromide and substituted vanadium halides and substituted vanadium oxyhalides, particularly those wherein the substituents are chosen from alkyloxy and aryloxy groups. Examples of such substituted vanadium halides and oxyhalides are $VOCl_2(OC_2H_5)$, $VOCl_2(OC_2H_5)_2$ and tri-n-butylvanadate. Complex compounds of vanadium such as vanadium trisacetylacetonate have also been used.

In commercial polymerization processes, the most commonly used vanadium compound is the pentavalent vanadium oxytrichloride ($VOCl_3$), but as mentioned, this and other vanadium compounds suffer from low catalyst efficiency. In order to improve this low catalyst efficiency, many catalyst activators have been proposed for use with the vanadium compound and co-catalyst system. The most effective of these activators are generally considered to be the alkyl esters of trichloroacetic and tribromoacetic acids, the ethylene glycol monoalkyl ether esters, particularly monoethyl ether esters of trichloroacetic acid or tribromoacetic acid, and esters of perchlorocrotonic acid, since these have been found to improve catalyst efficiency considerably.

To take an example of a known commercial technique, butyl perchlorocrotonate is used as a reactivator for vanadium oxytrichloride catalyst systems, which are used in the bulk polymerization of EPM and EPDM polymers, in combination with a haloaluminiumalkyl co-catalyst such as aluminium sesquihalide. It is believed that the catalyst system produced on contacting the components suffers from deactivation because of conversion of the active $V^{5+}$ species to inactive $V^{2+}$ species. The butyl perchlorocrotonate reactivates that $V^{2+}$ to $V^{3+}$ which is active as a catalyst in the system of the polymerization process.

Many publications are known which teach the use of esters of halogenated organic acids for the purpose of reactivating catalyst systems derived from the contact of vanadium oxytrichloride and an organoaluminium co-catalyst in the polymerization environment. Although some of these suggest the use of such reactivators with catalyst systems employing vanadium compounds in general, it is noticeable that in fact the specific teachings of all go to the use of vanadium oxytrichloride/organo-aluminium compound catalyst systems, because these are the only systems which can readily be used in commercial polymerization processes.

Thus, European Pat. No. 59,034 (1982; Sumitomo) is concerned with the production of ethylene-propylene co-polymers by a series reactor process, and the inventive aspects of the Sumitomo patent relate to the use of two reactors connected in series and operated at different temperature levels. The use of such reactors is said to be necessary since the catalyst activators conventionally employed in ethylene co-polymerization processes lead to the production of polymers which are deficient in parameters such as green strength, creep, cold flow and general processability. This prior art teaching discloses polymerization process conditions whereby the monomers are contacted in the presence of organo-aluminium compounds, trivalent to pentavalent vanadium compounds and, as a catalyst activator, an ester of an halogenated organic acid which may be present in a wide range of concentrations based on the vanadium. It is noted that the examples are specific on use of vanadium oxytrichloride as the vanadium component of the catalyst system (although vanadium trichloride is mentioned apparently in error at page 12 line 6). Although it is stated that the activator may be added in admixture with one or more of the catalyst components, in fact in the examples the activator is injected into the polymerization zone directly. There is no teaching to use an halogenated organic acid ester in direct combination with a vanadium tetrachloride solution.

British Pat. No. 1,444,169 (Huls) relates to a two-stage polymerization process using a titanium-/aluminium catalyst in the first stage and a vanadium-/alkyl aluminium sesquihalide catalyst in the second stage. To improve the activity of the catalyst a perchlorocrotonic acid ester, preferably butyl perchlorocrotonate, can be added in amounts of 1 to 2 mols per mol of vanadium oxytrichloride. Again, the prior art is specific on the use of vanadium oxytrichloride as the second stage catalyst component, and teaches injection of the activator into the polymerization zone to modify the catalyst system formed in situ by contact of the specified catalyst components.

British Pat. No. 1,403,372 (ISR) teaches the polymerization of ethylene optionally with up to 20 mol percent of another alpha-olefin, using a catalyst comprising a vanadium compound and a specific organoaluminium compound, and in the presence of hydrogen and a halogenated organic compound. The exact function of this halogenated organic compound is not clear, but it is generally used in excess with regard to the vanadium concentration. Once again, the vanadium catalyst specifically discussed and exemplified is vanadium oxytrichloride, and again this catalyst component and the halogenated compound are each injected directly into the polymerization reaction zone.

A typical liquid phase commercial polymerization process employs apparatus comprising a polymerization zone or reactor, to which are delivered the various components which constitute the reactants, solvents or catalysts. For example, in a process for producing EPDM terpolymer, there is delivered to the polymerization zone the monomers constituted by ethylene, propylene and a diene such as ENB; solvent such as hexane; and the components of the catalyst system which are typically a solution of vanadium oxytrichloride in hexane, and an organo-aluminium cocatalyst such as aluminium sesquihalide. Additional activators may also be delivered into the polymerization zone.

The polymerization is typically carried out in the liquid phase under stirred conditions, continuously, at a temperature of about 30° C. The polymerization product mixture is then delivered from the polymerization zone and quenched to halt the polymerization reactions. The quenched product is then de-ashed, that is the catalyst components are removed, leaving a mixture comprising a polymer/hexane solution which also contains unreacted monomers and other process additives. Water is introduced into this system to yield a polymer/water slurry which is passed to a settler where polymer and water are separated and any diene contained therein is removed for recycling to the polymerization zone. The organic components of the polymerization products such as solvent and excess propylene are passed to a flash drum where distillation separates the hexane solvent from propylene which is recycled to the polymerization zone. Distillation generally destroys any organic additives present in the hexane, although the distilled hexane will certainly contain small proportions of monomeric such as propylene and diene. This distilled hexane is recycled to the polymerization zone, although a proportion of it is directed to the catalyst make-up facilities, where it is used to prepare the catalyst component solutions for injection into the polymerization zone.

The system described above is perfectly acceptable when using vanadium oxytrichloride as the vanadium compound catalyst component, given the acceptance of the generally low catalyst efficiency of this compound. However, it is known that vanadium tetrachloride is a much more active catalyst than vanadium oxytrichloride, but suffers the disadvantage of being more susceptible to heat and light degradation, with formation of vanadium trichloride and a chlorine radical. Vanadium trichloride is insoluble in the organic solvents typically employed in polymerization processes. Thus, a major drawback in employing the more reactive vanadium tetrachloride species as a catalyst component is that there is almost inevitably a plugging of catalyst delivery systems. For this reason vanadium tetrachloride is not widely used commercially, even though it is under certain reactor conditions three times more catalytically active than vanadium oxytrichloride. If vanadium tetrachloride could be used commercially without leading to plugging, then its improved catalyst efficiency would be a major advance in the art.

More specifically, the problems associated with use of vanadium tetrachloride are that it is a liquid which decomposes easily to solid components which clog the catalyst transfer lines and make it difficult to pump or meter accurately. The decomposition products are not useful as catalysts and the decomposition is rather difficult to stop. Indeed, it proceeds very readily on dilution of the vanadium tetrachloride with organic solvents such as hexane, and even faster in the presence of olefins such as ethylene, propylene and dienes, e.g. ENB. This is a major problem in commercial polymerization processes such as that described above, because hydrocarbons such as hexane and olefins such as ethylene and propylene are nearly always present in the recycle streams. Moreover, in systems where the organic solvent is recovered and recycled, and a proportion of it is employed to dissolve the catalyst species prior to delivery into the polymerization zone, the plant operator is effectively dissolving the vanadium catalyst species in a solvent, which itself and through contaminants contained therein, is guaranteed to promote the decomposition of the vanadium tetrachloride molecules to insoluble and useless components.

This difficulty in handling vanadium tetrachloride catalyst on a commercial basis is the reason why the prior art discussed above does not detail use of vanadium tetrachloride, and there is a long-standing desideratum in the art to provide an improved means of using this valuable catalyst component in the presence of olefins and organic solvents, especially at temperatures which are consistent with dissolving the catalyst in a recycled (distilled) solvent stream.

Investigations into the behavior of vanadium tetrachloride as a catalyst component have led to several conclusions, all of which indicate the difficulties encountered by those seeking to use the material in commercial catalysts. Thus, vanadium tetrachloride is a liquid which only undergoes a slow thermal decomposition in its pure form, the decomposition half life at room temperature being in excess of $10^4$ days. However, solutions of vanadium tetrachloride in organic solvents such as hexane are much less stable than the pure liquid. It is believed that the hexane readily undergoes free radical chlorination by the chlorine radical which is the primary produce of vanadium tetrachloride decomposition. This absorption of the chlorine radical tends to promote vanadium trichloride production. Indeed the decomposition of vanadium tetrachloride in hexane at 65° C. is quite rapid and the rate of decomposition increase with time, being an autocatalytic reaction. The rate of decomposition of vanadium tetrachloride in hexane drops on lowering the temperature; for example, at 25° C. solutions are more or less stable for up to 10 hours, and at 0 °C. there is only minimal decomposition after two or three days. This behavior of vanadium tetrachloride solutions therefore mitigates against the use of the catalyst in processes wherein it is convenient to dissolve the catalyst in hexane, especially recycled hexane, without the expensive step of cooling the hexane which has been distilled to minimize contamination.

With regard to contamination, as mentioned above, recycled hexane in a polymerization process would contain a small proportion of olefins. It now has been found that in the presence of olefins the decomposition reactions of vanadium tetrachloride are accelerated. The vanadium tetrachloride is believed to coordinate to the olefin, and is then subject to a homolytic fission of the vanadium-chlorine bond to form vanadium trichloride which is insoluble in hydrocarbon solution and hence precipitates out. Stable solid decomposition products are readily formed by the addition of terminal-alpha-olefin and strained ring, internal olefins. Moreover, vanadium tetrachloride itself may lead to polymerization of the olefins in hexane solution and these polymer products may be insoluble in the case of, for example polymerized norbornene or ENB. In each case, the product of the reaction between vanadium tetrachloride and olefin moieties in hydrocarbon solution results in an insoluble product which tends to clog catalyst delivery lines and make efficient and controlled polymerization impossible. As mentioned, this is particularly the case where the organic solvent is recovered from the continuous polymerization process and recycled, since this will contain small proportions of olefin such as the monomer propylene and the monomer diene, for example ENB.

SUMMARY OF THE INVENTION

A technique which permits use of vanadium tetrachloride in commercial polymerization plants without, or with great reduction in, the problems as discussed above, has now been identified. Thus, according to one aspect of the present invention there is provided a method of stabilizing a solution of vanadium tetrachloride in an inert organic solvent, which method comprises incorporating into the solution a decomposition-retarding amount of an halogenated organic compound having at least two halogen atoms attached to the same carbon atom, the halogen atoms being activated by an electron donor group (preferably carbonyl, carboxyl or amino) adjacent the carbon atom to which they are attached and/or by a carbon-carbon double bond (which may form part of a ring) alpha-beta to this carbon atom, as decomposition retardant for the vanadium tetrachloride.

A second aspect of the invention provides a continuous process for polymerizing olefin(s) in an inert organic solvent using a vanadium compound as catalyst and an organo-aluminium compound as cocatalyst, in which the catalyst is dissolved in the solvent in a catalyst make-up zone and then introduced in solution into a polymerization zone for contact with solvent, olefin(s) and co-catalyst; polymerization is performed in said polymerization zone; the polymerization product mixture is withdrawn from the polymerization zone, quenched, de-ashed and subjected to a solvent separation stage; and separated solvent is recycled to the polymerization zone and to said catalyst make-up zone characterized in that the catalyst comprises vanadium tetrachloride and in that the catalyst solution introduced into the polymerization zone contains at least a decomposition-retarding amount of an halogenated organic compound having at least two halogen atoms attached to the same carbon atom, the halogen atoms being activated by an electron donor group adjacent the carbon atom to which they are attached and/or a carbon-carbon double bond (which may form part of a ring) alpha beta to this carbon atom, as decomposition retardant for the vanadium tetrachloride.

DETAILED DESCRIPTION OF THE INVENTION

As used herein, the term polymerization is intended to include both homo-polymerization and copolymerization, and co-polymerization is intended to include both the simple polymerization of two different monomers and the polymerization of three or more monomers.

Preferably, the decomposition retardant is incorporated into the vanadium tetrachloride solution in an amount of from 0.5 to 30 mol percent, more preferably from 1 to 10 mol percent, per mol of vanadium present in the solution. The amount of decomposition-retardant necessary to provide effective stabilization of the vanadium tetrachloride depends on the components of the solution (solvent, contaminants) and on the temperature and pressure to which it is subjected. Such amount may readily be determined experimentally for any particular combination of solution and conditions. For example, in some cases it may be considered necessary to maintain the concentration of $VCl_4$ in solution at no less than, say 98% of its concentration (under the same conditions) when freshly prepared, for several hours. Alternatively, when conditions apply which would normally give extremely rapid degradation (e.g., high temperatures and high concentrations of degradation promoting contaminants) it may be extremely beneficial to be able to maintain the $VCl_4$ concentration at no less than, say, 90% of its freshly prepared value for just a few hours. The precise parameters would of course depend on the use which is to be made of the stabilized $VCl_4$ solution.

There are several practical distinctions between the invention and known techniques wherein catalyst activators have been introduced into polymerization processes. The vanadium tetrachloride solution stabilized according to the present invention exist outside of the polymerization zone while the know catalyst activators are active only when injected into the polymerization zone to have effect on the contact complexes. The polymerization zone contains an aluminum co-catalyst and monomer while the inventive stabilized solution need not contain co-catalyst. The known catalyst activators function to regenerate a $V^{3+}$ species from a $V^{2+}$ decomposition species whereas the stabilizers are effective to oxidize $V^{3+}$ solid products to $V^{4+}$ solvent soluble materials thereby in effect extending the lifetime of the $V^{4+}$ series. Furthermore, the known activators are generally used in amounts which are much greater than the concentration of vanadium in the system while the concentration of the stabilizers is only a fraction of the amount of $VCl_4$ in the system.

The $VCl_4$ decomposition retardant of this invention comprises at least one halogenated organic compound containing halogen atoms which are activated by electron donor groups adjacent the carbon carrying the halogen atoms. This donor group is preferably a carbonyl, carboxyl or amino group. In particular, the preferred decomposition retardant compound comprises an ester of an halogenated organic acid, especially perhalogenated organic acids, for example alkyl trihalo-acetates, ethylene glycol monoalkyl ethers, ester of trichloroacetic acid, alkyl perchlorocrotonates and mixtures thereof. Particularly preferred for use in accordance with the invention are $VCl_4$ decomposition retardants comprising at least one member selected from the group consisting of methyl trichloroacetate, ethyl trichloroacetate, methyl tribromoacetate, ethyl tribromoacetate, ethylene glycol monoethyl ether trichloroacetate, ethylene glycol monoethyl ether tribromoacetate, butyl and methyl perchlorocrotonate. An especially preferred compound for use as the $VCl_4$ decomposition retardant is butyl perchlorocrotonate (BPCC); and hereinafter the invention is discussed in terms of use of BPCC, although it should be recognized that this is only by way of example of the general class of compounds which may be used.

The inert organic solvent for the vanadium tetrachloride used in the method of the invention is preferably a hydrocarbon or halogenated hydrocarbon, such compounds being well known for use in polymerization reactions. By way of example there may be mentioned heptane, kerosene, cyclohexane, benzene, chloroform, trichloroethylene, tetrachloroethane and perchloro ethylene, although a solvent widely used commercially in polymerization process, and hence useful in accordance with the invention, is hexane.

The solution of vanadium tetrachloride which is stabilized in accordance with the invention may additionally include one or more olefinic compounds, for example in the range 0.01 to 2 weight percent based on the solution. These olefinic compounds may be terminal-alpha olefins such as propylene or a strained ringed, internal olefin or a diolefin. Linear or cyclic non-conjugated dienes or higher polyenes which are conventionally used in production of ethylene copolymers may be present in the solvent of the stabilized vanadium tetrachloride solution. Examples of such dienes are 5-ethylidene-2-norbornene, 5-methylene-2-norbornene, 1,4-hexadiene, 1,6-octadiene, dicyclopentadiene, cyclopentadiene, 5-isopropenyl-2-norbornene and methyl tetrahydroindene, and these may be present in the vanadium tetrachloride solution. It will be understood the greater amounts of the olefinic compounds may be utilized and that any of the conventionally employed olefins may be used in the practice of the present invention. The stabilized solutions may exist at a range of temperatures, and may be used at the lower temperatures at which typical polymerization reactions take place. However, the stabilization presents the advantage that the solutions may be used at higher then usual temperatures, for example the solutions may be at a temperature of $-50°$ to $+100°$ C., more particularly from $15°$ to $70°$ C.

As mentioned, an important feature of the invention is that the vanadium tetrachloride solution is stabilized outside of a polymerization zone, that is outside of a zone where organo-aluminium must be present. Thus the stabilized vanadium tetrachloride solution preferably does not contain organo-aluminium compounds utilized in polymerization processes. The solutions stabilized by the method of the invention may contain vanadium tetrachloride in any concentration. However, solutions which are intended for use in polymerization processes would typically contain from 0.001 to 1.0 mol of vanadium tetrachloride per liter of solution.

Conventional organo-aluminium compounds may be used in the polymerization process of the invention as co-catalyst with the vanadium tetrachloride. For example the co-catalyst may be an organo-aluminium compound of formula $R_nAlX_{3-n}$ in which R represents a $C_1$ to $C_{20}$ hydrocarbon radical, X represents a halogen atom or an alkoxy group and n is an integer or non-integer of from 1 to 3. Organo-aluminium compounds included within this formula include trialkyl aluminiums, dialkyl aluminium monohalides, alkyl aluminium dihalides, alkyl aluminium sesquihalides and dialkyl aluminium monoalkoxides. Specific examples of such organo-aluminium compounds include triethylaluminium, triisopropylaluminium, tri-isobutylaluminium, trihexylaluminium, diethylaluminium chloride, diethylaluminium bromide, ethylaluminium dichloride, ethylaluminium sesquichloride, di-isobutylaluminium chloride, isobutylaluminium sesqui chloride and isobutylaluminium dichloride. Such compounds may be used singly or in any combination.

The process according to the invention may employ any olefin as the monomer which is subjected to polymerization. In a preferred embodiment the process is used to produce co-polymers of ethylene and an alpha-olefin of formula $CH_2=CHR^1$ in which $R^1$ represents a straight or branched chain alkyl group, preferably a $C_1$ to $C_6$ alkyl group such as propylene, butene-1, pentene-1, hexene-1 and 4-methyl pentene-1. The olefinic monomers may also include a proportion, for example up to 10 weight percent, of linear or cyclic non-conjugated dienes or higher polyenes, for example 5-ethylidene-2-norbornene, 5-methylene-2-norbornene, 1,4-hexadiene, 1,6-octadiene, dicyclopentadiene, cyclopentadiene, 5-isopropenyl-2-norbornene and methyl tetrahydroindene. Particularly preferred dienes are 5-ethylidene-2-norbornene, dicyclopentadiene and 1,4-hexadiene. The product formed when polymerizing ethylene, propylene and such a diene is of course termed EPDM.

The general process conditions for such a polymerization are well understood in the art, the pressures and temperatures in the polymerization zone being adjusted to suit the particular reaction which is taking place. Similarly, the proportion of monomers and other additives such as hydrogen which is a chain transfer agent will be adjusted in dependence on the composition and other properties of the polymerization product, as desired. Techniques for quenching, deashing and separating out the polymer product and other components present in the polymerization mixture, are also well understood in the art and so need not be described in detail here.

The following specific embodiments illustrate the invention.

EXAMPLE 1

The behavior of vanadium tetrachloride solutions in hexane was investigated by preparing, at ambient temperature, a stock solution of 1.5 wt % vanadium tetrachloride in pure hexane. Aliquots of the vanadium tetrachloride solution were then separated into individual vessels and quantities of butylperchlorocrotonate (BPCC) were introduced into the aliquots such as to yield solutions containing BPCC in amounts of 0 mol % (i.e., the stock $VCl_4$ solution), 3 mol %, 7 mol %, 10 mol % and 30 mol % based on the number of mols of $VCl_4$ in the solutions.

Each aliquot was then heated to 65° C. at a pressure of one atmosphere, and samples were withdrawn at half hourly, hourly or two-hourly intervals over a period of up to 14 hours. The $VCl_4$ concentration of each sample was measured by UV-visible absorbance at 410 nm using a Perkin Elmer Lambda 7 spectrophotometer, the variation in $VCl_4$ concentration with time being a measure of the degradation of the $VCl_4$ molecule under the applied conditions. The results are reported in Table 1, from which it may be seen that at 65° C., which is the normal reflux temperature for hexane in polymerization processes and hence the temperature at about which it is most convenient to use the hexane in polymerization catalyst component make-up system, there is a rapid degradation of the $VCl_4$ in the stock solution 1A. However, with the solutions stabilized in accordance with the method of the invention there is a marked increase in solution stability, with no more than 2 mol % degradation over 4 hours for 1B, 6 hours for 1C, 8 hours for 1D and at least 14 hours for 1E. The amount of BPCC required to stabilize $VCl_4$ can thus readily be assessed for given temperature of preparation, storage and use conditions.

EXAMPLE 2

The general procedure of Example 1 was repeated, but using a $VCl_4$ stock solution in which the hexane was not pure, but contained 0.2 wt % (based on the hexane) of an olefin, 1-octene. The degradation behavior of an aliquot 2A stock solution was followed and compared with an aliquot 2B which additionally included BPCC (10 mol % based on the molar quantity of vanadium tetrachloride in the aliquot). From Table 1 it may be seen that the presence of the olefin results (Example 2A) in VCl₄ degradation which is much more rapid than is the case with a pure hexane solvent (Example 1A), being in excess of 50% after only four hours. In contrast, the presence of 10 mol % BPCC (Example 2B) clearly gives a major improvement in the VCl₄ stability, the degradation still being less than 10% after three hours at 65° C.

EXAMPLE 3

The general procedure of Example 2 was repeated, but in this case the VCl₄ stock solution used as solvent was hexane containing 0.2 wt % (based on hexane) of 5-ethylidene-2-norbornene (ENB). From Table 1 it may be seen that the unstabilized VCl₄ solution containing ENB (Example 3A) exhibited rapid degradation, this being well over 10% after 1 hour and reaching about 70% degradation after 5 hours at 65° C. In contrast, the stabilized solution still retained 97% of its vanadium in the form of VCl₄ after one hour, and degradation was still less than 10% after two hours.

As has been mentioned hereinbefore, VCl₄ generates an extremely active polymerization catalyst species in combination with organo-aluminium cocatalysts, and would be widely used in continuous polymerization processes if only it could be accurately metered in solution into the polymerization zone without danger of clogging, which leads to varying catalyst characteristics and hence inconsistent polymer product properties. The above Examples have clearly shown that the method of the invention provides a convenient way of stabilizing VCl₄ solutions under conditions which are generally more severe than would advantageously be employed in polymerization processes. Indeed, the process of the invention has been demonstrated and it has been shown to have the benefits of the VCl₄ complex catalyst activity with the difficulties hitherto encountered when attempting to use VCl₄ on a commercially acceptable basis.

rating into the solution a decomposition-retarding amount of a halogenated organic compound having at least two halogen atoms attached to the same carbon atom, the halogen atoms being activated by an electron donor group adjacent the carbon atom to which they are attached and/or by a carbon-carbon double bond as a decomposition retardant for the vanadium tetrachloride, and excluding co-catalyst for the VCl₄ therefrom.

2. A method of stabilizing a solution of vanadium tetrachloride in an inert organic solvent, outside of a polymerization zone, which method comprises incorporating into the solution a decomposition-retarding amount of a halogenated organic compound having at least two halogen atoms attached to the same carbon atom, the halogen atoms being activated by an electron donor group adjacent the carbon atom to which they are attached and/or by a carboncarbon double bond as a decomposition retardant for the vanadium tetrachloride wherein the decomposition retardant is incorporated in an amount of from 0.5 to 30 mol percent per mol of vanadium present in the solution and excluding co-catalyst therefrom.

3. The method according to claim 2 wherein the decomposition retardant is incorporated in an amount of from 1 to 10 percent per mol of vanadium present in the solution.

4. The method according to claim 1, 2 or 3 wherein the decomposition retardant comprises an ester of an halogenated organic acid.

5. The method according to claim 4 wherein the decomposition retardant is selected from the group consisting of alkyl trihaloacetates, esters of ethylene glycol monoalkyl ethers with trichloroacetic acid, alkyl perchlorocrotonates and mixtures thereof.

6. The method according to claim 5 wherein the decomposition retardant is selected from the group consisting of methyl trichloroacetate, ethyl trichloroacetate, ethylene glycol mono ethyl ethertrichloroacetate, butyl perchlorocrotonate, methyl perchlorocro-

TABLE 1

| | Example | | | | | | | | |
|---|---|---|---|---|---|---|---|---|---|
| | 1A | 1B | 1C | 1D | 1E | 2A | 2B | 3A | 3B |
| | mol % BPCC | | | | | | | | |
| | 0 | 3 | 7 | 10 | 30 | 0 | 10 | 0 | 10 |
| Time (Hours) | % of VCl₄ retained | | | | | | | | |
| 0 | 100 | 100 | 100 | 100 | 100 | 100 | 100 | 100 | 100 |
| 0.5 | — | — | — | — | — | — | — | 93 | 99 |
| 1 | 97 | 99 | 99 | 99 | 99 | 82 | 97 | 78 | 97 |
| 2 | 95 | 99 | 99 | 99 | 99 | 68 | 95 | 61 | 93 |
| 3 | 92 | 99 | 99 | 99 | 99 | 57 | 92 | 50 | 86 |
| 4 | 87 | 98 | 98 | 98 | 98 | 47 | 86 | 42 | 73 |
| 5 | — | — | — | — | — | 41 | 75 | 34 | 60 |
| 6 | 78 | 91 | 98 | 98 | 98 | 36 | 65 | — | 50 |
| 7 | — | — | — | — | — | — | 55 | — | — |
| 8 | 60 | 87 | 94 | 98 | 98 | — | — | — | — |
| 10 | 50 | — | 84 | 96 | 98 | — | — | — | — |
| 12 | — | — | — | 92 | 98 | — | — | — | — |
| 14 | — | — | — | 90 | 98 | — | — | — | — |

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A method of stabilizing a solution of vanadium tetrachloride in an inert organic solvent outside of a polymerization zone, which method comprises incorpotonate and mixtures thereof.

7. The method according to claim 4 wherein the decomposition retardant comprises butyl perchlorocrotonate.

8. The method according to claim 1 wherein the inert organic solvent comprises a hydrocarbon or halogenated hydrocarbon.

9. The method according to claim 8 wherein the solvent is selected from heptane, kerosene, cyclohexane, benzene, trichloroethylene, hexane, and perchloroethylene.

10. The method according to claim 8 wherein the solvent comprises hexane.

11. The method according to claim 1 wherein the solution comprises from 0.01 to 2.0 weight percent olefinic compounds.

12. The method according to claim 11 wherein said olefinic compound is an alpha olefin.

13. The method according to claim 12 wherein the or one of the olefinic compounds comprises propylene.

14. The method according to claim 11 wherein the or one of the olefinic compounds is a cyclic non-conjugated diene or a diolefin.

15. The method according to claim 14 wherein the or one of the olefinic compounds comprises 5-ethylidene-2-norbornene (ENB), dicyclopentadiene or 1,4-hexadiene.

16. The method according to claim 1 wherein the solution is at a temperature of from −50° to 100° C.

17. The method according to claim 16 wherein the solution temperature is in the range 15° to 70° C.

18. The method according to claim 1 wherein the solution comprises from 0.001 to 1.0 mol of vanadium tetrachloride per liter of solution.

19. The method according to claim 1 where said halogen atoms are activated by an electron donor group adjacent the carbon atom to which they are attached and/or by a carboncarbon double bond alpha-beta to said carbon atom.

20. A vanadium tetrachloride solution stabilized by the method according to claim 1.

21. In a continuous process for polymerizing one or more olefins in an inert organic solvent using a vanadium compound as catalyst and an organo-aluminum compound as co-catalyst, in which the catalyst is dissolved in a catalyst make up zone and then introduced in solution into a polymerization zone for contact with solvent, olefin(s) and co-catalyst; polymerization is performed in said polymerization zone; the polymerization product mixture is withdrawn from the polymerization zone, quenched, de-ashed and subjected to a solvent separation stage; and separated solvent is recycled to the polymerization zone and to said catalyst make up zone; the improvement comprising utilizing vanadium tetrachloride as the catalyst and the catalyst solution introduced into the polymerization zone is a stabilized vanadium tetrachloride solution according to claim 20.

22. The process according to claim 21 wherein the temperature of the catalyst solution introduced into the polymerization zone is from 15° to 70° C.

23. The process according to claim 21 wherein the olefins which are polymerized comprise ethylene, a higher alpha-olefin, the polymer product being an ethylene copolymer.

24. The process according to claim 23 wherein the ethylene copolymer product comprises EPM or EPDM.

25. The process according to claim 21 in which the organo-aluminium compound used as co-catalyst has the general formula $R_nAlX_{3-n}$ in which R represents a $C_1$ to $C_{20}$ hydrocarbon radical, X represents a halogen radical or alkoxy group and n is an integer or noninteger of from 1 to 3.

26. The process according to claim 23, wherein the olefins further comprise a linear or cyclic diene or higher polyene having non-conjugated double bonds.

* * * * *